UNITED STATES PATENT OFFICE.

JOSEF WEBER, OF ESSEN-ON-THE-RUHR, GERMANY, ASSIGNOR TO GOLDSCHMIDT DETINNING COMPANY, OF NEW YORK, N. Y., A CORPORATION OF NEW JERSEY.

METHOD OF COLORING ENAMELS AND THE LIKE.

1,181,944.  Specification of Letters Patent.  Patented May 2, 1916.

No Drawing.  Application filed November 27, 1914.  Serial No. 874,315.

*To all whom it may concern:*

Be it known that I, JOSEF WEBER, subject of the King of Prussia, and resident of Essen-on-the-Ruhr, in the Province of the Rhine, Germany, have invented a certain new and useful Method of Coloring Enamels and the like, of which the following is a specification.

The invention relates to the method of coloring enamels, glazes and the like.

In the manufacture of opaque enamels and the like as heretofore practised, stannic oxid has been largely employed as the most satisfactory agent for producing the necessary opacity. Owing to the high cost of stannic oxid, many attempts have been made to produce a satisfactory substitute therefor, usually in the form of other metal compounds, but such substitutes have not been productive of satisfactory results. Among other such metallic compounds suggested as substitutes for stannic oxid, calcium stannate containing water and represented by the formula $CaSnO_3.4H_2O$ has been employed, but the results have been unsatisfactory, and the enamel to which this substitute is applied lacks many of the desirable characteristics of similar enamels in which stannic oxid is used for the opacity producing agent.

It has been found, according to the present invention, that anhydrous stannate of calcium possesses certain distinct physical properties which render it particularly effective as an opacity producing agent for enamels and the like, quite equal to that of stannic oxid. Furthermore, the compound, when so applied to enamels is affected but very slightly by acids, effectively resists high temperatures and can be applied with the enamel to the articles to be treated very readily to produce a smooth even coating.

It has been found that the opacity producing qualities of anhydrous calcium stannate are, in large measure, dependent upon the method of manufacturing the compound and that when the said compound is formed as a finely divided precipitate from a suitable solution, and subsequently treated to render it anhydrous, the opaquing qualities are enhanced to a high degree. An anhydrous stannate of calcium, of large volume, and possessing the other above named advantageous qualities may be obtained in the following manner: An alkaline solution of stannic oxid is treated with a soluble calcium salt, for example chlorid of calcium which precipitates calcium stannate in finely divided form. A sufficient quantity of acid, such as hydrochloric acid is then added to the solution for the purpose of neutralizing the same, and the precipitate containing stannate of calcium and water is separated from the solution by any appropriate means after which it is dried and calcined to entirely eliminate the water. It is found desirable to add the acid in order to remove any excess of the alkaline component. The resultant product of the foregoing process, containing about 72 per cent. of stannic oxid, when applied in the manufacture of white and opaque enamels and the like is found to equal the more expensive pure stannic oxid in opaquing qualities, resistance to acids and high temperatures, and enables the enamels to be laid on quite as effectively as does pure stannic oxid. In all these properties, the new opacity producing agent is far superior to the forms of water containing stannate of calcium as heretofore employed.

What I claim is:—

1. The method of coloring enamels, which consists in incorporating in the enamel, an opaque colorant comprising anhydrous stannate of calcium.

2. The method of coloring enamels, which consists in incorporating in the enamel, an opaque colorant comprising neutralized anhydrous stannate of calcium.

JOSEF WEBER. [L. S.]

Witnesses:
HELEN NUFER,
ALBERT NUFER.